United States Patent
Michail et al.

(10) Patent No.: US 8,624,899 B2
(45) Date of Patent: Jan. 7, 2014

(54) ARC SPLINE GPU RASTERIZATION FOR CUBIC BEZIER DRAWING

(75) Inventors: Ashraf A. Michail, Redmond, WA (US); David B. Teitlebaum, Seattle, WA (US); Brandon C. Furtwangler, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 12/890,760

(22) Filed: Sep. 27, 2010

(65) Prior Publication Data
US 2012/0075310 A1     Mar. 29, 2012

(51) Int. Cl.
G06F 17/00    (2006.01)
G06T 1/00     (2006.01)
G06T 15/40    (2006.01)

(52) U.S. Cl.
USPC ............................ 345/442; 345/418; 345/441

(58) Field of Classification Search
None
See application file for complete search history.

(56) References Cited

U.S. PATENT DOCUMENTS

| | | | |
|---|---|---|---|
| 5,046,023 A * | 9/1991 | Katsura et al. | 345/619 |
| 7,239,319 B2 * | 7/2007 | Loop | 345/467 |
| 2004/0001061 A1 | 1/2004 | Stollnitz et al. | |
| 2007/0097121 A1 | 5/2007 | Loop et al. | |
| 2007/0097123 A1 | 5/2007 | Loop et al. | |
| 2010/0013854 A1 | 1/2010 | Michail | |

OTHER PUBLICATIONS

"Direct GPU Rendering of Curves and Surfaces" Retrieved at <<http://web.archive.org/web/20090305111216/http://research.microsoft.com/en-us/projects/gpu_rendering_curves_and_surfaces/default.aspx>>, Published on Mar. 5, 2009.*

Riškus, Aleksas, "Approximation of a Cubic Bezier Curve by Circular Arcs and Vice Versa", Retrieved at << http://itc.ktu.lt/itc354/Riskus354.pdf >>, Information Technology and Control, vol. 35, No. 4, 2006, p. 371-378.

Andrew, "Convert Ellipse to Cubic Bezier", Retrieved at << http://www.mail-archive.com/svg-developers@yahoogroups.com/msg03305.html >>, Apr. 10, 2005, pp. 4.

Plant, Darrel, "Working with Cubic Paths in a Quadratic World", Retrieved at << http://www.informit.com/articles/article.aspx?p=24821&seqNum=5 >>, Jan. 4, 2002, pp. 3.

(Continued)

Primary Examiner — Aaron M Richer
Assistant Examiner — Robert Craddock
(74) Attorney, Agent, or Firm — Chin IP, PLLC; David Chin (57) ABSTRACT

A curve drawing system is described herein that rasterizes arc splines in the GPU of a computer for cubic Bezier drawing of strokes and thin features. The curve drawing system first converts a cubic Bezier representation into an arc spline representation. Then the curve drawing system uses a similar approach to Loop/Blinn modified to cause the pixel shader to perform a point-in-circular-arc test instead of a point-in-Bezier test. Calculating arc radius is a much simpler operation than the alternatives and can be easily and efficiently performed by the pixel shader. Since the stroke of an arc spline is also an arc spline, the drawing system provides a resolution-independent representation of strokes. Thus, the curve drawing system allows several previously difficult graphical features to be efficiently drawn by readily available legacy hardware and used in software programs that are designed to run on a wide variety of hardware.

20 Claims, 4 Drawing Sheets

(56) References Cited

OTHER PUBLICATIONS

Onstott, Scott, "Bezier Splines in SketchUp Using Ruby Scripts", Retrieved at << http://www.aecbytes.com/ tipsandtricks/2009/issue42-sketchup.html >>, May 22, 2009, Issue 42, pp. 8.

"Direct GPU Rendering of Curves and Surfaces", Retrieved at << http://research.microsoft.com/en-us/projects/gpu_rendering_curves_and_surfaces/default.aspx >>, Jun. 21, 2010, pp. 2.

Loop, et al., "Rendering Vector Art on the GPU", Retrieved at << http://http.developer.nvidia.com/GPUGems3/gpugems3_ch25.html >>, Jun. 18, 2010, pp. 19.

Muizelaar, Jeff, "Geometry Homework", Retrieved at << http://muizelaar.blogspot.com/ >>, Oct. 7, 2009, pp. 7.

Loop, Charles et al.; "Resolution Independent Curve Rendering using Programmable Graphics Hardware"; ACM Transactions on Graphics (Proceedings of SIGGRAPH 2005) 24(3); 2005; 10 pages.

\* cited by examiner

ARC SPLINE GPU RASTERIZATION FOR CUBIC BEZIER DRAWING

BACKGROUND

Computer programs over the years have become more and more visually appealing using various graphical techniques. Aside from its main function, a typical computer program today has an enormous amount of graphical calculation going on under the hood. For example, programs often render fonts using resolution-independent vector graphics that can be easily scaled and manipulated with various transforms. Programs often render buttons and other graphical user interface (GUI) elements with a smooth, rounded edge, and so forth. To avoid interfering with the program, designers often strive to offload as much of the graphical burden to a dedicated Graphics Processing Unit (GPU) as possible. Curves are often approximated using cubic Bezier splines, and using the GPU to draw a cubic Bezier involves translation into a representation such as a set of triangles, a pixel shader, and a vertex shader that a GPU can draw.

One common type of drawing request that is difficult to handle in the GPU using existing techniques are stroked cubic Beziers. Cubic Beziers curves are a useful approximation for drawing thin curved lines. However, a stroke involves a thickness of the line whereby related lines some distance from the original are to be drawn and the space between the lines is to be filled. For example, a thick font or curved button with a shadow might involve a stroked cubic Bezier. On the other hand, very thin features, particularly at the sub-pixel level, are also difficult to draw using the GPU.

To support fast animation of cubic Beziers, any representation should remain scale independent and be reused when the transform has changed across frames. One known approach to solve this problem is the Loop/Blinn algorithm (Loop, Charles, and Jim Blinn. 2005. "Resolution Independent Curve Rendering using Programmable Graphics Hardware." In ACM Transactions on Graphics (Proceedings of SIGGRAPH 2005) 24(3), pp. 1000-1008.), which evaluates the cubic Bezier in a pixel shader and enables resolution-independent drawing of cubic Beziers. Unfortunately, this approach is not capable of efficiently drawing stroked cubic Beziers curves, which are common in vector graphics. In particular, a stroke of a cubic Bezier is not itself a cubic Bezier and evaluating the distance from a cubic Bezier is not a simple operation to perform in a pixel shader. In addition, the Loop/Blinn algorithm is not suited to drawing thin features since it relies on non-overlapping curve decomposition, which is not always possible with a thin curve stroke. Even a thickness of one pixel may produce incorrect rendering results.

For artistic strokes, such as textures that follow the curve of a stroke, length along the curve can be used to texture map a stroke template along the curve. This information is not readily available with the Loop/Blinn algorithm in the pixel shader. Most scale-independent rendering solutions for MICROSOFT™ DIRECTX™ 9 hardware are based on the Loop/Blinn approach. More recent MICROSOFT™ DIRECTX™ 11 hardware can solve the problem with hardware tessellation using a multi-sample buffer. However, cutting-edge hardware is slowly adopted.

SUMMARY

A curve drawing system is described herein that rasterizes arc splines in the GPU of a computer for cubic Bezier drawing of strokes and thin features. The curve drawing system first converts a cubic Bezier representation into an arc spline representation. Then the curve drawing system uses a similar approach to Loop/Blinn modified to cause the pixel shader to perform a point-in-circular-arc test instead of a point-in-Bezier test. Calculating arc radius is a much simpler operation than the alternatives and can be performed easily and efficiently by the pixel shader. Since the stroke of an arc spline is also an arc spline, the drawing system provides a resolution-independent representation of strokes. Thus, the curve drawing system allows several previously difficult graphical features to be efficiently drawn by readily available legacy hardware and used in software programs that are designed to run on a wide variety of hardware.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A curve drawing system is described herein that rasterizes arc splines in the GPU of a computer for cubic Bezier drawing of strokes and thin features. The curve drawing system first converts a cubic Bezier representation into an arc spline representation. Several techniques for doing so are well known in the art (e.g., Riskus, Aleksas. 2006. "Approximation of a Cubic Bezier Curve by Circular Arcs and Vice Versa." In Information Technology and Control, 2006, Vol. 35, No. 4, pp. 371-378). Then the curve drawing system uses a similar approach to Loop/Blinn modified to cause the pixel shader to perform a point-in-circular-arc test instead of a point-in-Bezier test. Calculating arc radius is a much simpler operation than the alternatives and can be performed easily and efficiently by the pixel shader. Alternatively or additionally, the curve drawing system can encode two or more curves in each triangle and intersect these curves to allow thin features to be represented. Since the stroke of an arc spline is also an arc spline, the drawing system provides a resolution-independent representation of strokes. The curve length is trivial to compute for a circular arc, and this approach enables artistic strokes. The representation of two or more curves in each triangle and intersecting the curves allows for thin, sub-pixel features. Thus, the curve drawing system allows several advanced but common and previously difficult graphical features to be efficiently drawn by readily available legacy hardware and used in software programs that are designed to run on a wide variety of hardware.

As described further herein, the curve drawing system solves the stroke problem by: 1) converting a cubic Bezier into an arc spline representation using an algorithm such as Riskus, 2) using a modified Loop/Blinn approach to perform a point-in-circular-arc test instead of a point-in-Bezier test, and 3) in each test, encoding two or more curves instead of one and intersecting those curves to allow for thin features to be drawn. Since the stroke of an arc spline is also an arc spline, this provides a resolution-independent representation of strokes. In addition, the curve arc length is trivial to compute for a circular arc, and this approach enables artistic strokes. The curve drawing system accomplishes the second step by encoding each arc in a triangle. Since both line segments and arcs have to be encoded, an encoding with the arc radius is not used since this would result in infinite distances in the case of lines (or near straight curves) which cannot be used in a point-in-arc test. In some embodiments, the curve drawing system solves this problem by instructing the pixel shader to assume all arcs are centered at coordinates (0, 0) with radius one and the texture units on the triangle are used to map the coordinate system of the actual arc to the unit circle. This encoding can represent a straight edge by duplicating a texture coordinate, which is equivalent to an infinitesimally small segment of the circular arc.

The curve drawing system also modifies a typical representation that encodes one curve per triangle to encode two (or more) curves per triangle and intersect them to allow for thin features. For example, suppose an arbitrary cubic pixel is subdivided into a set of triangles such that each triangle contains a left curve and a right curve. The intersection of these two curves allows for a thin vertical line or curve to be represented. With this representation, the point-in-circle test as well as the anti-aliasing approach discussed by Loop/Blinn can be performed with the following pixel shader for both the left and right curves. For purposes of illustration, this sample is simplified but those of ordinary skill in the art will recognize that it can be easily modified to provide more information on the outside/inside of the arc with a sign bit.

```
// Compute distance from left/right arcs from the unique cube
dist[0] = dot(vs.pos1, vs.pos1);
dist[1] = dot(vs.pos2, vs.pos2);
dist = sqrt(dist);
// Compute anti-aliasing based on distance to curve
float2 alpha = clamp(0.5 + (1.0 − dist)/(abs(ddx(dist)) +
abs(ddy(dist))), 0, 1);
// Sample the texture at that position and output a texture color
return textureSampler.Sample(g__samLinear, vs.pos1)*(alpha[0]−
alpha[1])*vs.Color;
```

Figure 1:
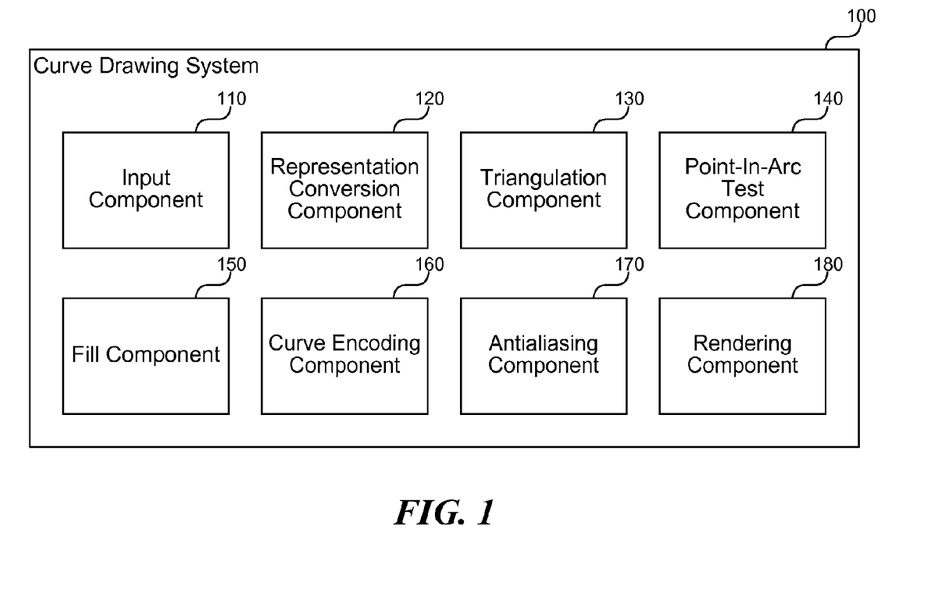
FIG. 1 is a block diagram that illustrates components of the curve drawing system, in one embodiment.

FIG. 1 is a block diagram that illustrates components of the curve drawing system, in one embodiment. The system 100 includes an input component 110, a representation conversion component 120, a triangulation component 130, a point-in-arc test component 140, a fill component 150, a curve encoding component 160, an antialiasing component 170, and a rendering component 180. Each of these components is described in further detail herein.

The input component 110 receives a cubic Bezier representation of a path describing one or more shapes. For example, a drawing program may output an image of an object using one or more cubic Bezier curves. The input component 110 receives one or more data structures that describe the curves and the region or regions that are defined as interior and exterior of the curves. For example, for a TrueType font, a letter can be described by one or more cubic Bezier curves with the letter defined as the interior and any background or open space in the letter defined as exterior. The interior portions are filled during rendering to create the expected displayed shape. The system 100 may be implemented within a software program or as an externally callable module or component. The input component 110 receives input using one or more programmatic conventions well known to those of ordinary skill in the art. For example, the component 110 may expose a function for invoking the system 100 and may receive a description of a path to draw in one or more data structures received as parameters to the function.

The representation conversion component 120 converts the received cubic Bezier representation into an arc spline representation. Whereas several control points define a cubic Bezier, an arc spline is typically defined as several arcs of circles having a particular origin and radius. The two representations are similar and both easily rendered. However, whereas it is very difficult to determine distance from a particular point on a cubic Bezier curve (a common computation for strokes), it is much easier to determine distance from an arc spline, which is typically simply a modification of the radius. Conversion back and forth between cubic Bezier representation and arc spline representation can be efficiently performed by modern CPUs or graphics hardware.

The triangulation component 130 produces a set of triangles that represents the interior region of the path defined by the arc spline representation. Modern graphics hardware renders many shapes as triangles, and the triangulation component 130 converts a shape defined in any other representation into a set of triangles that can be passed to the graphics hardware for rendering. In typical cubic Bezier representations, triangulation is performed based on drawing triangles to each of the Bezier control points and adding additional triangles for any regions having sharp edges or other features not covered in triangulation between the control points.

The point-in-arc test component 140 determines whether a particular point lies within an arc defined by the arc spline representation. This test is a replacement of the Bezier-based test used by the Loop/Blinn algorithm. The modified test operates on paths represented by arc splines to determine whether a particular point lies within the interior region of a path defined by arc splines. The test can be efficiently performed in modern graphics hardware using a pixel shader or other techniques. Typically, the test involves a distance comparison between the point and the origin of the arc circle. The radius of the arc circle can be used to determine if the point is inside or outside the arc. In some embodiments, triangulation is performed on a CPU while the point-in-arc test is performed in a pixel shader while rendering the triangles.

The fill component 150 fills in the set of triangles to visually represent a shape to be rendered based on the received path. The fill component may apply a particular color or texture to the filled region to compose the interior of the path. For example, for a letter of a font, the fill may include a black foreground color representing the letter and a white background color representing the surface on which the letter is rendered.

The curve encoding component 160 encodes two or more curves within a single triangle for representing thin features. In the past, each triangle typically would include a single curve and algorithms like Loop/Blinn used extra care to ensure that no two triangles overlapped to avoid producing undesirable visual artifacts. Where overlapping occurred, such methods further decompose the curves until overlapping is no longer present. This technique makes it difficult to render thin features, which often occur at a sub-pixel level. The curve encoding component 160 can place multiple curves within the same triangle and intersect the curves to create complex shapes. This technique is particularly well suited to rendering thin features that were difficult with previous techniques.

The antialiasing component 170 smoothes edges of curves approximated by triangles to avoid visible rough edges. Without antialiasing, objects rendered using triangulation can appear jagged and appear to turn on and off as they move and overlap pixels in different patterns. Antialiasing alleviates such visual artifacts by approximating a smooth edge along jagged surfaces, such as by super-sampling the point-in-arc tests within the pixel shader after triangulation. Those of ordinary skill in the art will recognize numerous available techniques for applying antialiasing prior to rendering.

The rendering component 180 renders the resulting shape produced by the other components. The rendering component 180 may include specialized graphics hardware, such as a GPU including pixel and/or vertex shaders for efficient rendering. The rendering component 180 produces a visual representation of the shape on a screen or other display device so that the shape is visible to the user.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
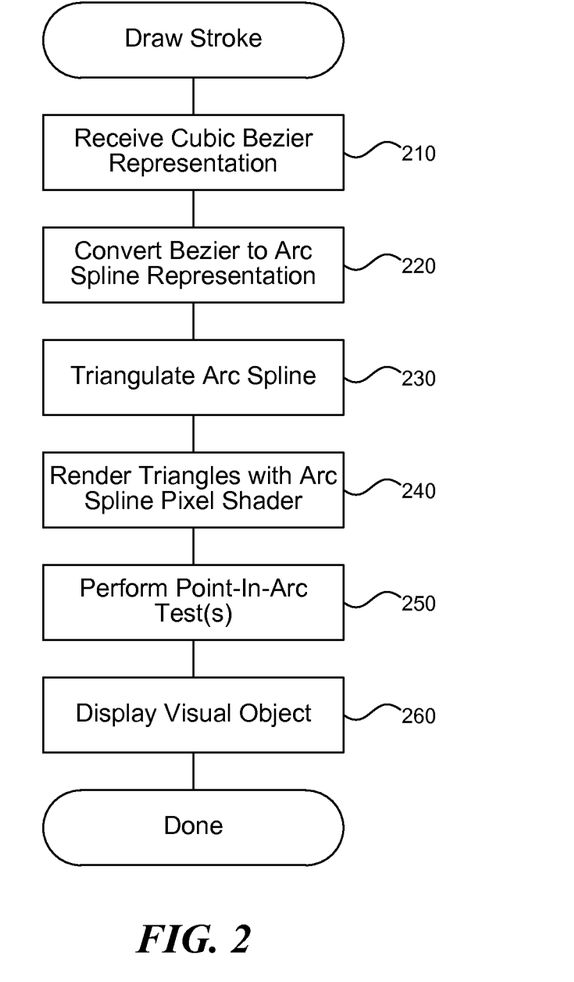
FIG. 2 is a flow diagram that illustrates processing of the curve drawing system to draw a stroked cubic Bezier curve, in one embodiment.

FIG. 2 is a flow diagram that illustrates processing of the curve drawing system to draw a stroked cubic Bezier curve, in one embodiment. Beginning in block 210, the system receives a cubic Bezier representation of a visual object to be rendered. For example, the system may receive the representation from a drawing program or GUI component of a software application. The cubic Bezier representation describes the visual object in using resolution-independent vector graphics. Cubic Beziers curves are described by four points, a start point, an endpoint, and two control points. The control points "pull" the curve in the direction of the control points, but the curve does not actually pass through the control points. Additional control points can be added to further refine the curve shape. A Bezier spline is simply multiple Bezier curves attached end-to-end. While a cubic Bezier representation is great at describing many types of curves, it is difficult to calculate distance from various points of the curve, such as to draw a thick stroke or artistic stroke.

Continuing in block 220, the system converts the cubic Bezier representation into an arc spline representation. An arc spline representation includes multiple circular arcs that have start and end points, an origin point, and a radius (which can be inferred from the other points). The circular arcs approximate the same shape as the cubic Bezier representation. However, unlike the cubic Bezier representation it is much simpler to determine distance from a curve defined by an arc spline, as distance typically involves a quantifiable difference in the radius from the origin point. Thus, once in the arc spline representation, strokes and other distance-based relationships to the curve can be calculated using readily available graphics hardware, such as pixel shaders of a GPU. This representation works well up to 200× zoom and stays fairly resolution independent. In addition, an arc spline representation maintains the continuity of the original cubic Bezier representation, which would be difficult to achieve using linear approximation of the Bezier curves.

Continuing in block 230, the system triangulates the visual object described by the arc spline representation to produce one or more triangles for rendering. Triangulation describes the shape of the visual object using a set of triangles that are common for rendering with modern graphical hardware. Those of ordinary skill in the art will recognize numerous well-known techniques for converting cubic Bezier and arc spline representations into one or more triangles for rendering. Interior triangles can be treated as degenerate arcs that are filled. In some embodiments, the system may optionally render the arcs themselves (e.g., using a geometry shader), rather than a triangulated representation. Selection of this option may depend on determining whether appropriate hardware is available. Continuing in block 240, the system renders the triangles with an arc spline pixel shader. Continuing in block 250, the system performs one or more point-in-arc tests during the rendering process for rendering the arc spline representation to determine one or more points that lie within the visual object represented by the arc spline representation. The point-in-arc test replaces the point-in-Bezier test that would be used for directly rendering the cubic Bezier representation (e.g., using the Loop/Blinn approach).

During rendering, the system fills the visual object based on the arc spline representation and triangulation. The interior of the visual object may be defined by convention (e.g., the area to the right of each curve arc or Bezier curve) or explicitly in one or more data structures that accompany the representation of the spline. The fill may include one or more colors or textures, and may be applied by pixel shaders or other available graphical hardware.

Continuing in block 260, the system displays the visual object using graphical hardware. For example, the system may invoke a GPU with the triangulation output and one or more pixel shaders to render the visual object efficiently. As the object changes (e.g., through user activity such as resizing or the nature of the object such as video playback), the system may transform a previously described representation of the object within the graphics hardware using well-known techniques. After block 260, these steps conclude.

Figure 3:
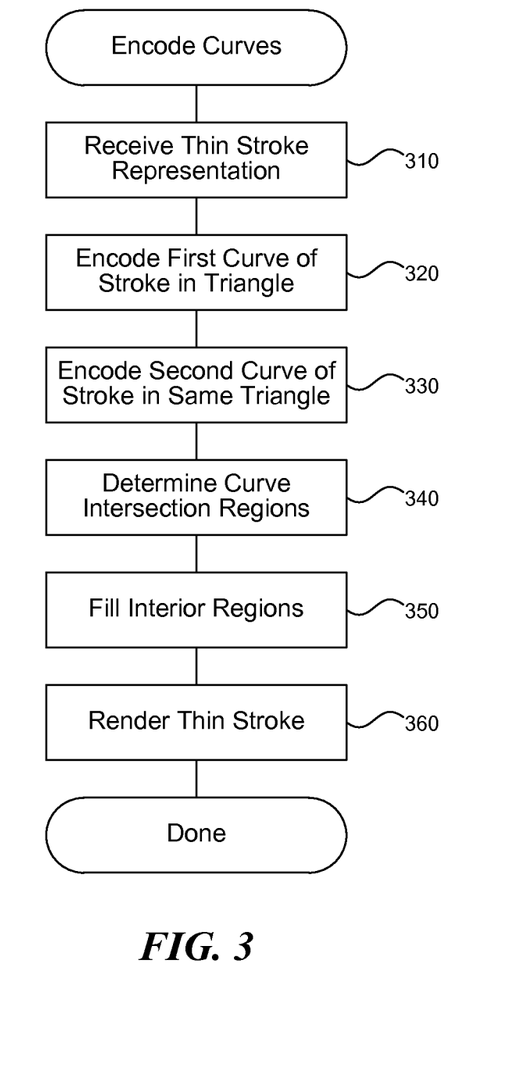
FIG. 3 is a flow diagram that illustrates processing of the curve drawing system to handle drawing of advanced curves using a GPU, in one embodiment.

FIG. 3 is a flow diagram that illustrates processing of the curve drawing system to handle drawing of advanced curves using hardware GPU, in one embodiment. Beginning in block 310, the system receives a graphical representation of a thin stroke that includes overlapping curves. For example, a thin stroke defined by a cubic Bezier curve may include two curves that define each edge of the stroke (e.g., the left and right sides of an artistic pen stroke). During triangulation using existing techniques (e.g., Loop/Blinn), overlapping curves are eliminated by adding additional control points or other subdividing techniques to avoid overlapping triangles, which leads to an inability to represent thin features.

Continuing in block 320, the system encodes a first curve in a triangle associated with the graphical representation of the thin stroke. During triangulation, curves are represented by one or more triangles. Using existing techniques, only one curve is encoded per triangle, and additional curves are placed in separate triangles that do not overlap the first. Continuing in block 330, the system encodes a second curve in the same triangle as the first curve. Unlike previous techniques, the system can place two or more curves in the same triangle. This allows the curves to interact through intersection so that thin features can be easily represented and overlapping is no longer a problem. In some embodiments, the system may encode additional curves within the same triangle, such as to allow definition of more complex overlapping shapes.

Continuing in block 340, the system determines an intersection of the first and second curves within the triangle. The intersection may define a filled area between the two curves or other visual object having then features to be rendered. Continuing in block 350, the system fills an interior region of the thin stroke determined by the intersection of the first and second curves within the triangulated area. For example, the system may apply a color or texture between the two curves to define a visual object like a pen stroke or letter of a font. Continuing in block 360, the system renders the triangle or triangles that include the received thin stroke using graphical hardware. For example, the system may pass the triangles as parameters in one or more instructions to a GPU. After block 360, these steps conclude.

Figure 4:
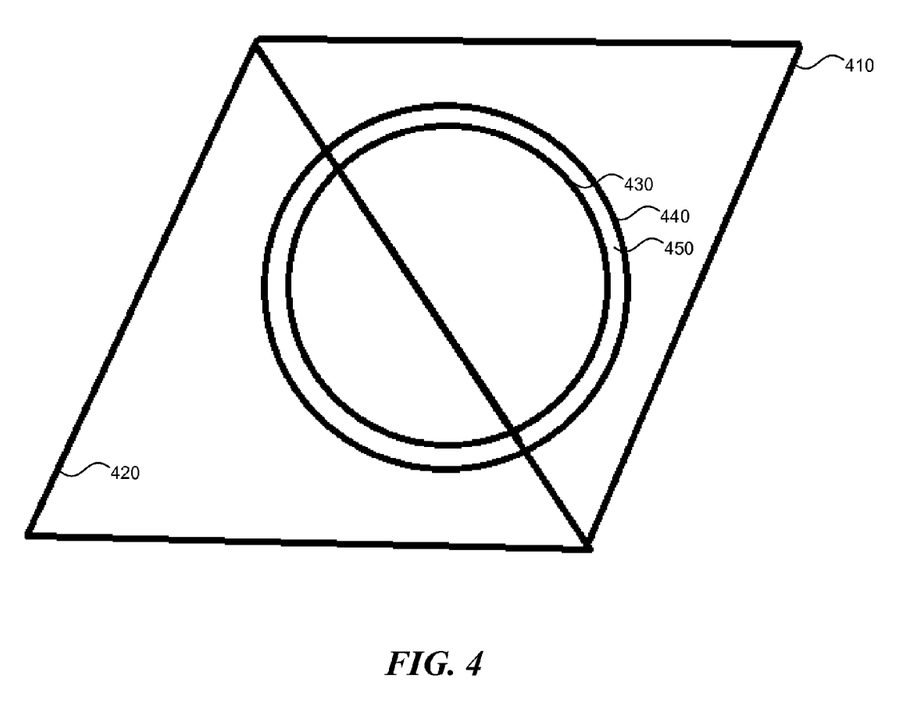
FIG. 4 is a display diagram that illustrates a thin stroked circle rendered by the curve drawing system, in one embodiment.

FIG. 4 is a display diagram that illustrates a thin stroked circle rendered by the curve drawing system, in one embodiment. The diagram includes a first triangle 410 and a second triangle. The triangles are typical triangles resulting from triangulation in preparation for rendering a visual object to graphical hardware. Within the triangles are two circles, an inner circle 430 and an outer circle 440. The circles may be defined by a cubic Bezier approximation (e.g., using four cubic Bezier curves), an arc spline representation as described further herein, or other suitable representation for defining the circles. The circles define a thin interior region 450 that represent a thin visual object to be rendered.

Using existing techniques, this type of rendering is not possible without subdividing the first triangle 410 and second triangle 420 until each triangle includes only one curve and no triangles overlap. For very thin features, such as those that are small enough to be at the pixel or sub-pixel level, this level of subdivision is not available or at least inefficient. By allowing multiple curves to be encoded within the same triangle, the curve drawing system eliminates the need for excessive work to eliminate overlap, and instead allows calculations that can reasonably and efficiently be performed in widely available graphical hardware. For example, half of the inner circle 430 and outer circle 440 can both be encoded within the same triangle 410. The intersection defined by the interior region 450 can be determined by a pixel shader and filled using a specified fill pattern.

In some embodiments, the curve drawing system operates on higher or lower order Bezier curves. For example, although conversion from cubic Bezier curves has been described herein, the system can also be applied to quadratic or other Bezier parameterizations, as well as other splines and polynomials. In addition, the system is suitable for converting from other representations (e.g., non-Bezier) that do not allow for efficient calculation of features a specified distance from the curve. Thus, where cubic Beziers representations are mentioned herein, they are provided only as examples, and those of ordinary skill in the art will recognize that the system can be easily extended to accommodate other representations by converting to the arc spline representation described herein.

In some embodiments, the curve drawing system encodes more than two curves or splines within the same triangle (e.g., either half of FIG. 4). The system can allow additional splines to define shapes that would overlap or cause other difficulties in traditional representations. Modern pixel shaders can handle calculations related to intersection and other interactions of a certain number of splines within a triangular region. By allowing a complexity of splines up to the available pixel shader limits, the system allows complex rendering to be performed efficiently and with fewer calculations than existing techniques.

From the foregoing, it will be appreciated that specific embodiments of the curve drawing system have been described herein for purposes of illustration, but that various modifications may be made without deviating from the spirit and scope of the invention. Accordingly, the invention is not limited except as by the appended claims.

We claim:

1. A computer-implemented method for drawing a stroked curve, the method comprising:
   receiving a Bezier representation of a visual object to be rendered, wherein the visual object is a stroke of a Bezier curve, and wherein the stroke of the Bezier curve is not a Bezier curve;
   converting the Bezier representation into an arc spline representation;
   triangulating the visual object described by the arc spline representation to produce one or more triangles for rendering;
   performing one or more point-in-arc tests during rendering to determine one or more points that lie within the visual object represented by the arc spline representation; and
   displaying the visual object using graphical hardware,
   wherein the preceding steps are performed by at least one processor.

2. The method of claim 1 wherein receiving the Bezier representation comprises receiving the representation from a graphical user interface component of a software application.

3. The method of claim 1 wherein receiving the Bezier representation comprises an artistic stroke related to one or more Bezier curves.

4. The method of claim 1 wherein receiving the Bezier representation comprises receiving a Bezier spline comprised of multiple Bezier curves that describe the visual object.

5. The method of claim 1 wherein converting to an arc spline representation comprises identifying multiple circular arcs that approximate the same shape as the Bezier representation.

6. The method of claim 1 wherein converting to an arc spline representation comprises converting to a representation from which distance to the curve can be determined within available graphics hardware.

7. The method of claim 1 wherein the point-in-arc test allows determining a distance of a feature of the visual object from the arc spline without performing calculations from the Bezier representation.

8. The method of claim 1 wherein triangulating comprises representing a shape of the visual object using a set of triangles for rendering with graphical hardware.

9. The method of claim 1 further comprising rendering at least one arc in the arc spline representation directly with graphical hardware without using the triangulated representation.

10. The method of claim 1 further comprising filling the visual object based on the arc spline representation and triangulation.

11. The method of claim 1 wherein displaying the visual object comprises invoking a graphics processing unit (GPU) and providing the rendered output.

12. The method of claim 1 wherein rendering the visual object comprises invoking one or more pixel shaders to render the visual object efficiently.

13. A computer system for resolution-independent rendering of advanced curved objects, the system comprising:
- a processor and memory configured to execute software instructions embodied within the following components;
- an input component configured to receive a Bezier representation of a path describing one or more shapes, wherein the path is a stroke of a Bezier curve, and wherein the stroke of the Bezier curve is not itself a Bezier curve;
- a representation conversion component configured to convert the received Bezier representation into an arc spline representation;
- a triangulation component configured to produce a set of triangles that represent an interior region of the path defined by the arc spline representation;
- a point-in-arc test component configured to determine whether a particular point lies within an arc defined by the arc spline representation;
- fill component configured to fill in the set of triangles to visually represent a shape to be rendered based on the received path; and
- a rendering component configured to render the resulting shape produced by the other components using graphics hardware to produce a visual representation of the shape on a display device.

14. The system of claim 13 wherein the input component is further configured to receive one or more data structures that describe the curves, and the region or regions that are defined as interior and exterior of the curves, wherein the interior portions are filled during rendering to create a displayed shape.

15. The system of claim 13 wherein the representation conversion component is further configured to convert control points that define the Bezier curve to arcs of circles having a particular origin and radius that define an arc spline, wherein the arc spline representation allows determining distance for features near the arc spline based on radius.

16. The system of claim 13 wherein the point-in-arc test component is further configured to operate on paths represented by an arc spline to determine whether a particular point lies within the interior region of a path defined by the arc spline.

17. The system of claim 13 wherein the triangulation component is further configured to produce a representation of a shape that can be rendered by graphics hardware.

18. The system of claim 13 further comprising a curve encoding component configured to encode two or more curves within a single triangle and determining an intersection of the curves for representing thin features.

19. The system of claim 13 further comprising an antialiasing component configured to smooth edges of curves approximated by triangles to avoid visible rough edges.

20. A computer-readable memory having instructions stored therein for controlling a computer system to draw advanced curves that include thin features, wherein the instructions, upon execution, cause a processor to perform actions comprising:
- receiving a graphical representation of a thin stroke that, upon triangulation, includes one or more overlapping triangles, wherein triangulation represents one or more curves using one or more triangles that can be drawn by graphical hardware;
- encoding a first curve in a triangle associated with the graphical representation of the thin stroke;
- encoding a second curve in the same triangle as the first curve, wherein encoding both curves in the same triangle allows the curves to interact through intersection so that thin features can be represented without eliminating overlapping triangles;
- determining an intersection of the first and second curves within the triangle, wherein the intersection defines at least one filled area between the two curves;
- filling an interior region of the thin stroke determined by the intersection of the first and second curves within the triangulated area; and
- rendering the triangle that includes the received thin stroke by invoking graphical hardware.

* * * * *